UNITED STATES PATENT OFFICE.

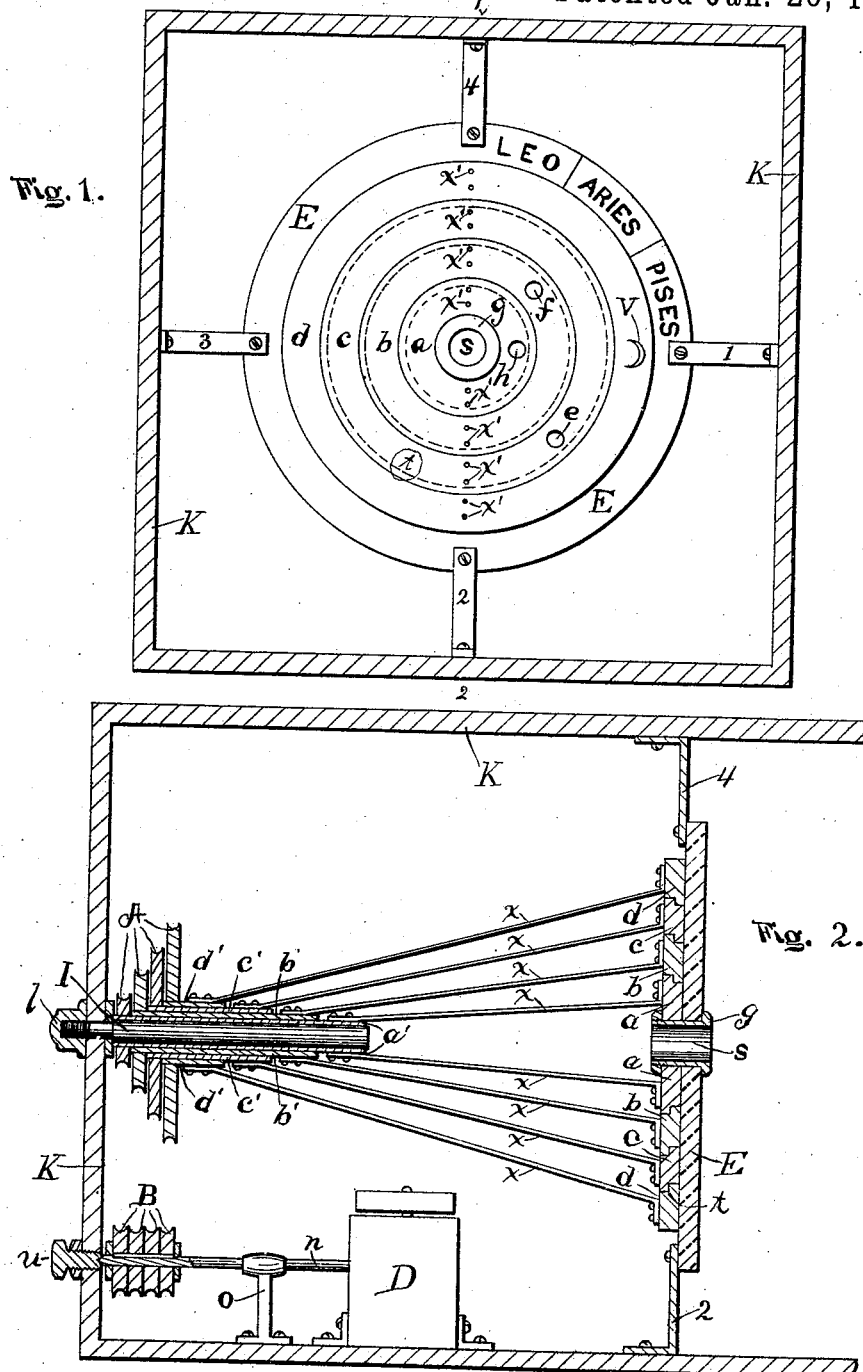

LEWIS REESE, OF CHICAGO, ILLINOIS.

PLANETARIUM.

SPECIFICATION forming part of Letters Patent No. 575,735, dated January 26, 1897.

Application filed June 10, 1896. Serial No. 594,912. (No model.)

*To all whom it may concern:*

Be it known that I, LEWIS REESE, a citizen of the United States, residing at Chicago, in the county of Cook and State of Illinois, have invented a new and useful Improvement in Planetariums, of which the following is a specification.

My invention is related to a class of astronomical apparatus used to teach the science of astronomy to classes or individuals.

The object of my improvement is to provide a less complicated method of construction, and by the use of belts and pulleys—in place of cog-gearing such as used at present—to cause the planet-rings to move steadily without the jerky motion produced by the cogs. The objects on the rings are magnified very large, and the unsteady motion is enlarged as well, which causes confusion. The pulleys may be increased or diminished in size on either or both shafts, so as to give the required motion to the planets.

I attain the objects by the mechanism illustrated in the accompanying drawings, in which—

Figure 1 is a vertical rear view showing the planet-rings *a b c d*, glass disk E, and the case or box K. Fig. 2 is a vertical longitudinal section on line 1 2, Fig. 1, showing all parts of the planetarium.

Similar letters refer to similar parts throughout the several views.

The case or box K may be made of any suitable form and material. At the center of the box, Fig. 2, a stud I is fixed to the case by the nut and thread 1. On this stud are a series of pulleys A, fitted with hubs or tubes of different length that sleeve on each other (shown at *d' c' b' a'*, Fig. 2) and are designed to turn independently on each other. Secured to these hubs and radiating from them are a series of arms, (marked *x*, Fig. 2,) whose forward ends are fixed to a series of concentric opaque rings *d c b a* at *x'*, Fig. 1. These rings I call "planet-rings," because they have apertures cut through them representing the several planets. (Shown at *h, f, e,* and *v*.) The outer and inner edge of each ring is rabbeted, as at *t*, so that they fit together and turn on each other independently.

A disk of glass E is fixed to the sides of the case by supports 1 2 3 4, Fig. 1, provided with a hub *g*, Figs. 1 and 2, fixed to the glass. On this hub the planet-rings turn freely. The hub is provided with an aperture S in its center representing the sun. The glass disk extends a suitable distance around the rings, and represents the celestial equator. It is divided into twelve equal parts, with the signs of the zodiac pictured or written thereon in proper place, as shown in Fig. 1, as Leo, Aries, Pisces, &c.

B is a series of pulleys fixed to a shaft *n*, supported by hanger *o* and set-screw *u*, and is driven by a spring-motor D. Belts pass upon the pulleys A and thus drive the planet-rings, the speed being increased, diminished, or multiplied by ordinary methods.

Only four pulleys and four planet-rings are shown in the drawings; but I do not wish to confine myself to that number, as they may be increased to eight, the number of primary planets in the solar system. Neither do I wish to confine myself to spring-motors, as any other may be used.

To operate this planetarium, place lights in the space behind the rings over the pulleys. Wind the spring and start it moving. Then darken the room and the planets will move around the sun in their regular order with the pictured signs of the zodiac on the celestial equator.

I am aware that planetariums constructed with movable opaque rings is not new; but

What I claim as my invention, and wish to secure by Letters Patent, is—

In a planetarium the combination of a casing; a fixed stud in the rear of said casing, a series of superimposed sleeves supported by the said stud, a series of annular rings in sliding contact with each other at the top of said casing supporting means extending from the said sleeves to the said rings, a glass plate provided with representations of the signs of the zodiac and covering said rings; a hole in each of said rings and a means to revolve the said sleeves to rotate the rings whereby, when a light is placed in the interior of said casing its rays passing through the said holes in the annular rings will represent various planets, substantially as described.

LEWIS REESE.

Witnesses:
M. E. GREGG,
C. C. BISHOP.